May 16, 1950 W. F. GAYRING ET AL 2,508,108
SHIRT FOLDING MACHINE

Filed Feb. 5, 1948 6 Sheets-Sheet 1

INVENTOR.
WALLACE F. GAYRING
JOHN NEUROTH
BY Bodell & Thompson
ATTORNEYS

May 16, 1950 W. F. GAYRING ET AL 2,508,108
SHIRT FOLDING MACHINE
Filed Feb. 5, 1948 6 Sheets-Sheet 3

INVENTOR.
WALLACE F. GAYRING
JOHN NEUROTH
BY Bodell & Thompson
ATTORNEYS

May 16, 1950  W. F. GAYRING ET AL  2,508,108
SHIRT FOLDING MACHINE
Filed Feb. 5, 1948  6 Sheets-Sheet 5

INVENTORS
WALLACE F. GAYRING
JOHN NEUROTH
BY
Badell E Thompson
ATTORNEYS.

*INVENTORS.*
WALLACE F. GAYRING
JOHN NEUROTH
BY
*Bodell & Thompson*
ATTORNEYS.

Patented May 16, 1950

2,508,108

UNITED STATES PATENT OFFICE 2,508,108

SHIRT FOLDING MACHINE

Wallace F. Gayring, Minoa, and John Neuroth, Syracuse, N. Y., assignors to The Prosperity Company, Inc., Syracuse, N. Y., a corporation of New York Application February 5, 1948, Serial No. 6,474

5 Claims. (Cl. 223—37)

This invention relates to machines for folding ironed shirts of the general type shown in Cooper Patent No. 2,362,976, issued November 21, 1944.

Folding machines of this type have heretofore included a pair of outside hinged folders for first folding the sleeves across the body of the shirt which is laid with the front side down on the folding table, and inside folders for folding the side portions of the shirt and the sleeves therewith over onto the intermediate portion of the shirt. The outside folders have heretofore been of the same radius from their hinged axes. In such machines, the ironed cuffs of the shirt would often times be folded, or come into position where they were folded by the folders and hence, the operator, after the sleeves were first folded, had to manipulate, or lay, the cuffs so that they would not be creased by the final folding operation of the inside folders, and hence, the inside folders performing the final folding were operated by hand.

One of the objects of this invention is an arrangement of the folding arms or folders, particularly the outside sleeve folding arms by which the cuffs always come into position where manipulation thereof is not necessary in order to avoid creasing the ironed cuffs, and operating by power all the folders in proper sequence.

Other minor objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1:
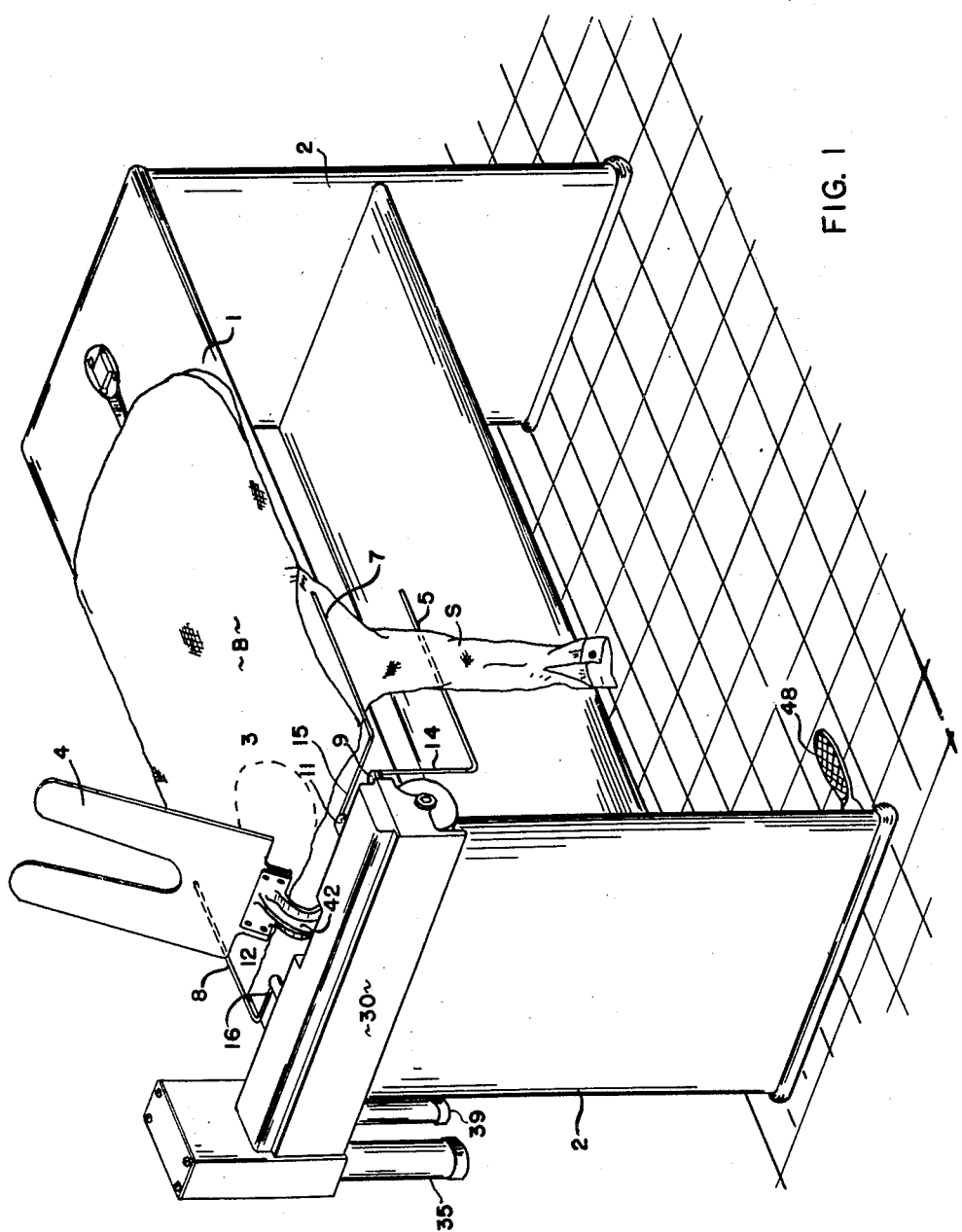
Figure 1 is an isometric view of this folding machine with the shirt laid thereon in position to be folded.

The numeral 1 designates a table on which the body B of the shirt is laid, with the sleeves S hanging over the edges of the table, the table being of such width as to accommodate adult size shirts, with the side edges of the body lying at, or near, the side edges of the table. The table is supported in any suitable manner, as by a frame 2. The table is formed with the usual recess 3, Figures 1 and 2, near one end midway between the sides thereof for receiving the ironed collar attached to the shirt, or the collar band. The shirt, when laid on the table, is laid with the front side down on the table. Within the recess is located a neck band clamp.

When the shirt is being folded, the sleeves are first folded across the shirt, or the back thereof, and then the side portions are folded onto the intermediate portion of the shirt, the sleeves at the same time being folded again, and then the tails of the shirt are folded up onto the body of the shirt. The area of the table occupied by the shirt when fully folded is, for convenience, referred to herein as the folded shirt area.

In the machine here illustrated, this area is determined by a form 4 about which the shirt is folded. After the shirt is folded, it is slipped endwise off the form. The form, however, may be dispensed with, or a cardboard of the proper dimension may be laid on the shirt after it is first dressed on the table. Oftentimes, both the form and the cardboard are used, and the cardboard left in the shirt to hold it from bending during packaging and carrying.

Figure 10:
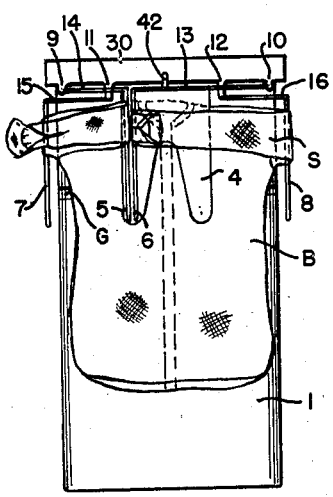
Figure 11:
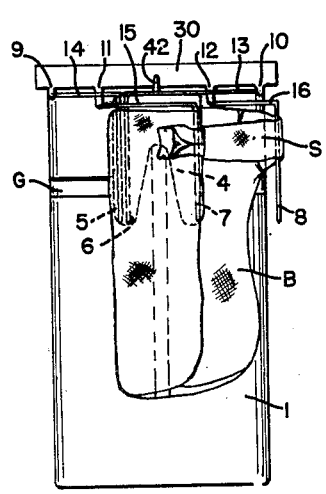
Figures 11 and 12 are views, similar to Figures 9 and 10, when one of the inside folders is operated and when both inside folders are operated respectively.
Figure 12:
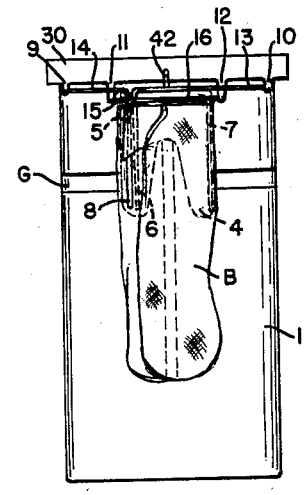
Figure 13:
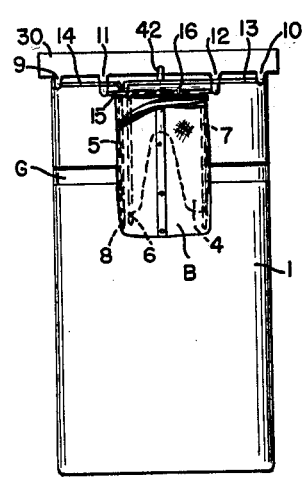
Figure 13 is a view of the completely folded shirt after the tail portion thereof is folded up by hand.

The folders include outside pairs 5, 6, which initially fold the sleeves, and inside pairs 7 and 8 for folding the side portions together with the folded sleeves over onto the intermediate portion of the shirt, that is, the portion of the shirt occupying the folded shirt area, or the portion of the shirt overlaid by the form 4. Both pairs of folders 5, 6 and 7, 8, are power operated. Each folder is in the form of a crank arm having an elongated crank pin extending in a direction lengthwise of the edges of the table 1. The outside folders are pivoted, or hinged, at 9 and 10 respectively on the frame of the actuating mechanism, along one end of the table, to move about axes extending along the side edges of the table respectively, and normally depend down over the edge of the table so that the sleeves of the shirt will initially hang over the crank portions. The inside folders 7, 8 are hinged or pivotally mounted at 11 and 12 on the frame of the actuating mechanism, and their axes extend lengthwise of the outer edges, or margins, of the folded shirt area. That is, as here shown along the outside margins of the form 4. The radial portion 13 of the crank arm 6 of one of the outside folders is longer than the radial portion 14 of the companion outside folder 5 in order to fold one shirt sleeve entirely across the folded shirt area, and to engage the sleeve just inside the cuff, so as not to crease the cuff, as seen at the upper right in Figure 10. The shorter radial arm 14 of the other outside folder 5 is of such length as to fold the sleeve between its ends up to the folded shirt area, the outer forearm portion of the sleeve then overhanging or extending beyond the inside folder 7, as seen at the upper left in Figure 10. The radial arms 15 and 16 of the inside folders 7 and 8 are of equal length so that when the folder 7 is operated it folds the sleeve thereon with the cuff of the sleeve clear of and beyond the crank portion of the folder 7, over onto the intermediate part of the shirt, or within the folded shirt area, and the cuff of the sleeve folded by the folders 5 and 7 is in a position shown in Figure 11. Thereafter, when the other intermediate folder 8 is operated, the sleeve of the shirt which has been folded by the folder 6 of greatest radius, is folded from the position shown in Figure 11 to that shown in Figure 12, so that the cuffs of both sleeves lie within the width of the folded shirt and are not creased during the folding operations by the crank portions of any of the folders, regardless of the length of the sleeves, which are usually from 31 to 35 inches. By reason of this arrangement of folders, the operator does not have to stand by to rearrange the cuffs, and all the folders can be power operated in sequence.

Figure 14:
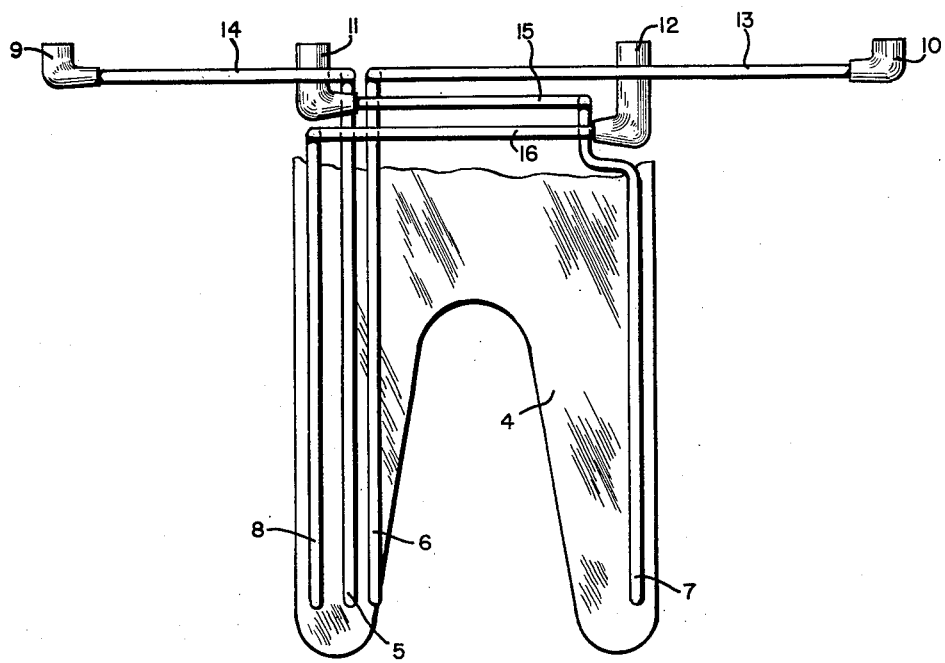
Figures 14 and 15 are fragmentary plans and end views of the folders when in final folded position and their relation to the folded shirt area, or the form on which the shirt is folded.
Figure 15:

As seen in Figures 14 and 15, the radial portions of the folders are in different planes and shaped to bridge over the crank portions of adjacent folders so that the folders do not interfere with each other during their folding operations, and during their return to normal position.

Figures 5, 6:
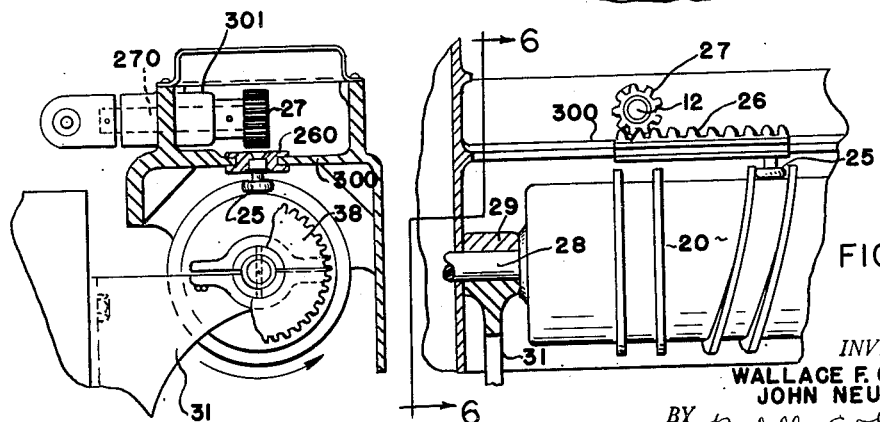
Figure 5 is an enlarged fragmentary view of parts seen at the left end of Figure 4, parts being broken away.
Figure 6 is a sectional view on line 6—6, Figure 5.
Figure 8:
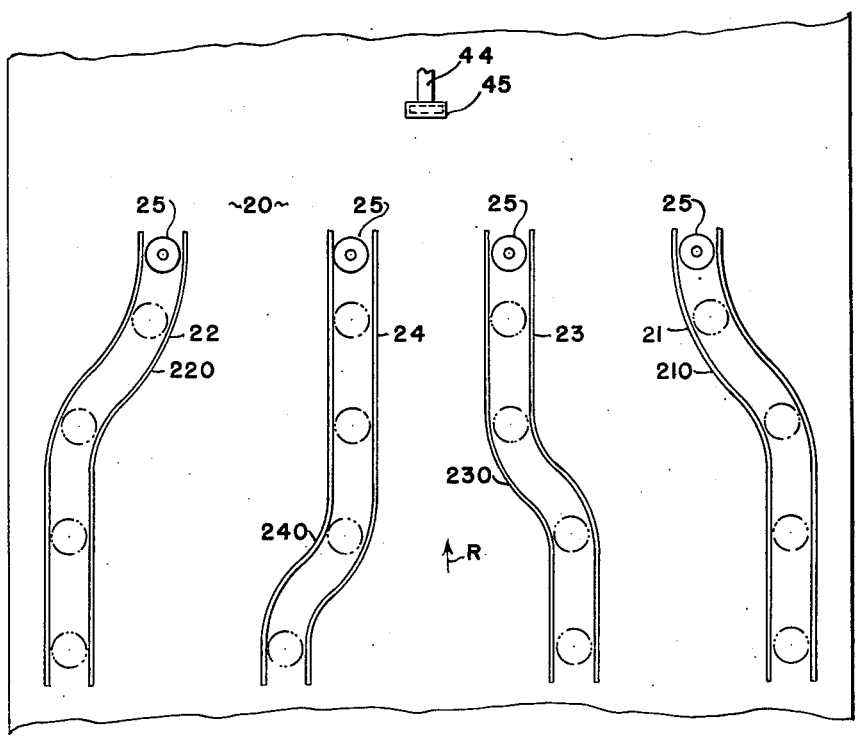
Figure 8 is a developed view of the cams of the actuating mechanism shown in Figures 3, 4, 5, 6 and 7.
Figure 9:
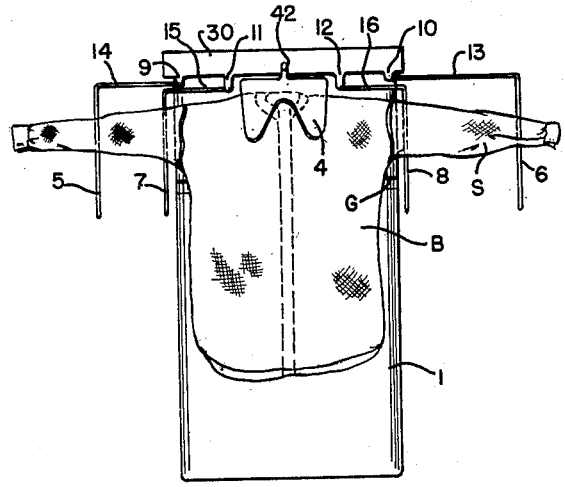
Figures 9 and 10 are diagrammatic views of the table with a shirt thereon showing the initial position of the folders and the position of the outside folders when operated, and the location of the sleeves when folded thereby relative to the folded shirt area of the table.

The mechanism for actuating the pairs of folders 5, 6, 7 and 8, is here shown as a rotating cylinder or drum 20 having cam tracks 21, 22, 23, 24, thereon coacting with followers, as 25, Figures 5 and 6, there being one track and one follower for each folder 5, 6, 7 and 8, and slides, as racks 26, one for each follower 25, these racks 26 meshing with pinions 27 respectively on the shafts 270, or axial pivots 9, 10, 11 and 12, on which the outside and inside folders 5, 6, 7 and 8 are mounted so that when the cylinder is being rotated, the folders are actuated in a sequence determined by the contour of the cam tracks 21, 22, 23, 24, as best seen in Figure 8. The racks 26 are guided in slots 260 formed in the top wall 300 of the support or housing 30. The shafts 270 are journalled in bearings 301 on said top wall. The lift portions 220, 210, of the cam tracks 22, 21, are located to operate the folders 6, 5, successively, and the lift portions 230, 240, of the tracks 23, 24, for the folders 7, 8, are located to operate the folders 7, 8, successively to each other and successively to the folders 6, 5.

Figure 4:
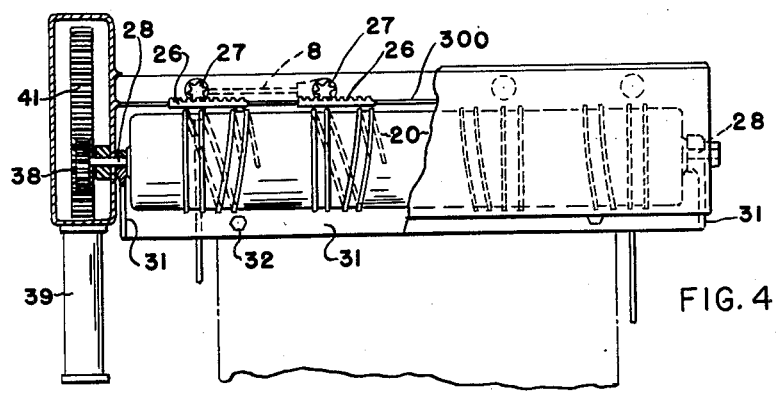
Figure 4 is a fragmentary view looking upwardly in Figure 3, a portion of the casing of the actuating mechanism being broken away.

The cylinder or drum 20 is mounted on a shaft 28 mounted in bearings 29 carried by a bracket 31, Figure 4, fixed at 32 to the frame of the table at one end thereof. The entire assembly, the supporting frame or housing, the cam drum, and the folders, tilt as a unit about the shaft 28.

The power means for actuating the cam drum or cylinder 20, as here shown, consists of cylinder and piston motor means. This motor means consists of two units, one for actuating the cam cylinder 20 in one direction, or counter-clockwise Figure 7, to operate the folders to folding position, and the other being a weaker unit which comes into action when the power is released from the stronger unit to actuate the cam drum in the opposite direction. The weaker unit is normally overruled by the stronger unit.

Figure 2:
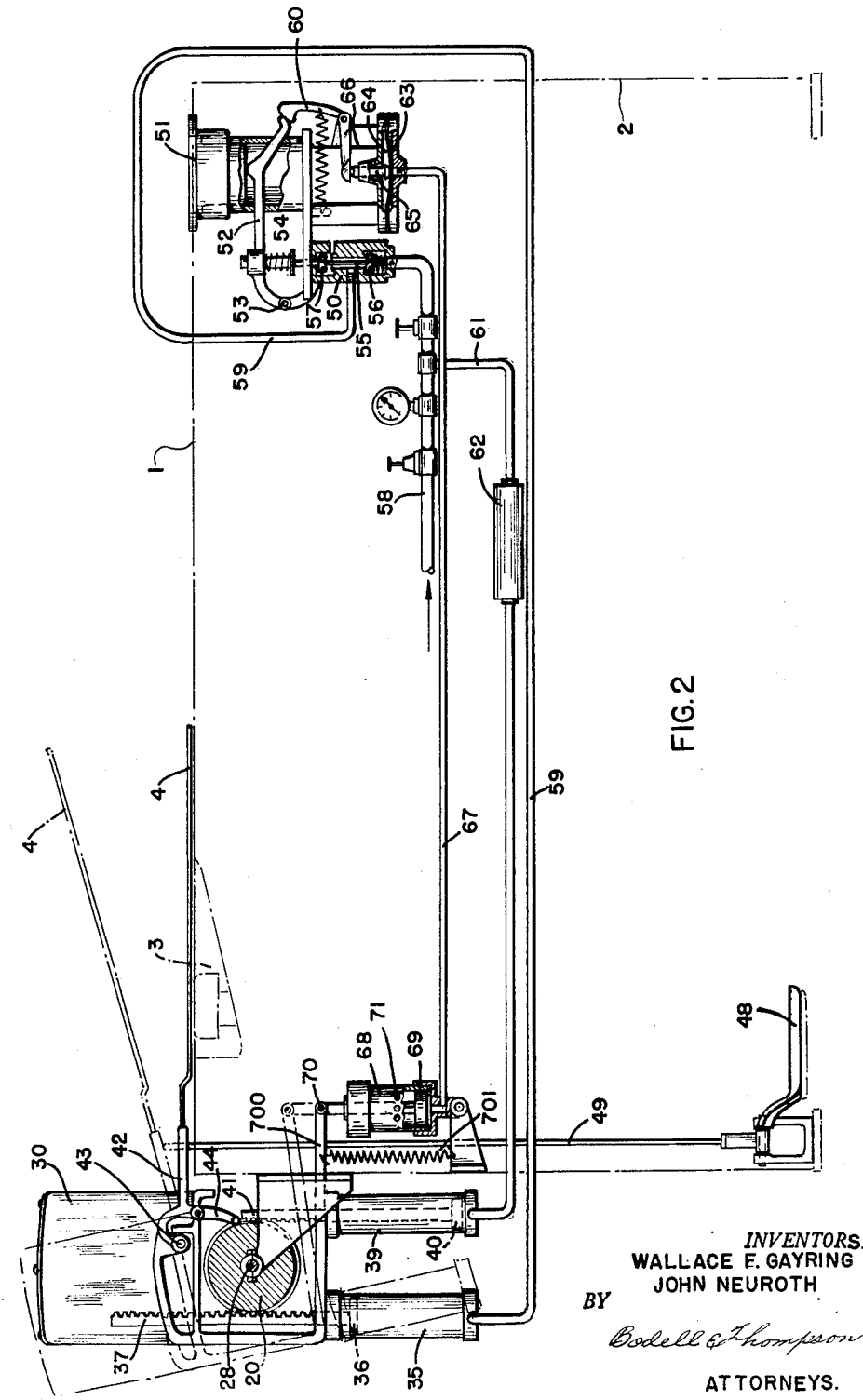
Figure 2 is a side elevation thereof, partly in section.

35, Figure 2, designates the cylinder of the stronger motor and 36 the piston therein, this unit being carried by the support or housing 30 and tiltable about the shaft 28 therewith. The piston rod 37 is formed with a rack meshing with a gear 38 on one end of the shaft 28 so that when the piston 36 is actuated, the cylinder 20 is turned in one direction to operate the folding members to folded position through the slides or racks 26, the pinions 27, and the followers in the cam tracks 21, 22, 23, 24.

The numeral 39 designates the cylinder of the weaker unit, this being also carried by the housing or frame 30 and having a piston 40 therein which moves oppositely to the piston 36. The rod 41 of the piston 36 is formed with a rack meshing with the gear 38 at a point diametrically opposite where the rack 37 meshes with said gear. Thus when the power, which is compressed air, is released from the cylinder 35, the air in the cylinder 39 is free to react and actuate the cam cylinder 20 to return the folders to starting position.

Figure 3:
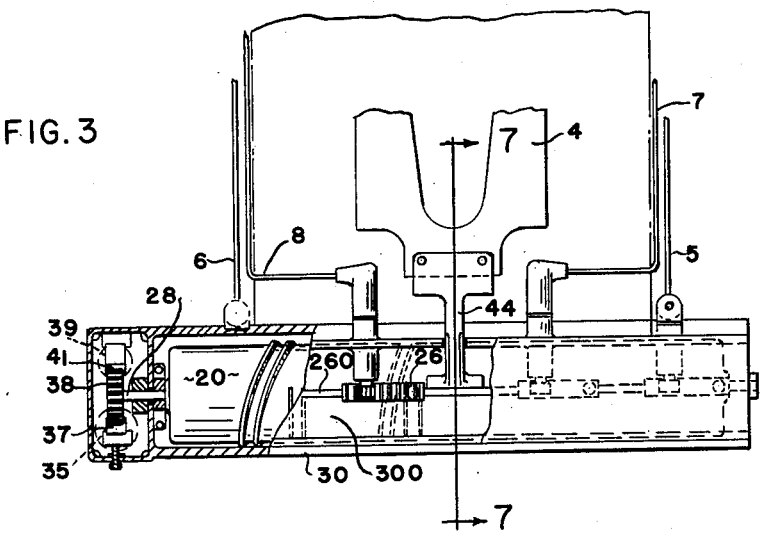
Figure 3 is a fragmentary plan view illustrating the arrangement of the folding arms relatively to the table, a portion of the cover of the casing for the actuating mechanism for the folders being removed.
Figure 16:
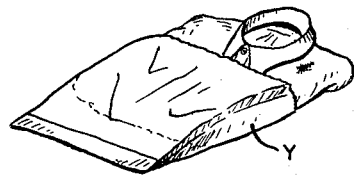
Figure 16 is a perspective of the finished folded shirt and the wrapper thereon.

The form 4, about which the shirt is folded, is pivoted by an arm 42 at one end thereof to the support or housing 30 at 43. It is lifted, as by a pedal, into the broken line position Figure 2, for the purpose of sliding the folded shirt off the form. When so lifted, the frame or housing 30 is tilted by the lifting effort about the shaft 28 due to the fact that the folders 5, 6, 7, 8, are interlocked in the shirt folded about the form 4. Sometimes, a paper bag Y, Figure 16, is slipped over the shirt before it is so removed, and sometimes a band is placed around the middle of the shirt on the form before the shirt is removed. The form returns, or drops, to its position flatwise on the table and is controlled in so doing by a follower arm 44, Figures 2, 3 and 7, riding on the periphery of the cam drum 20 and movable into a notch provided on shoulder 45 in the drum. The arm 44 is pivoted at 46 to the arm 42 and is pressed by spring 47 to hold its outer end, or a roller at said end, onto the periphery of the cam drum 20 and against the shoulder 45 when the shoulder registers therewith.

Figure 7:
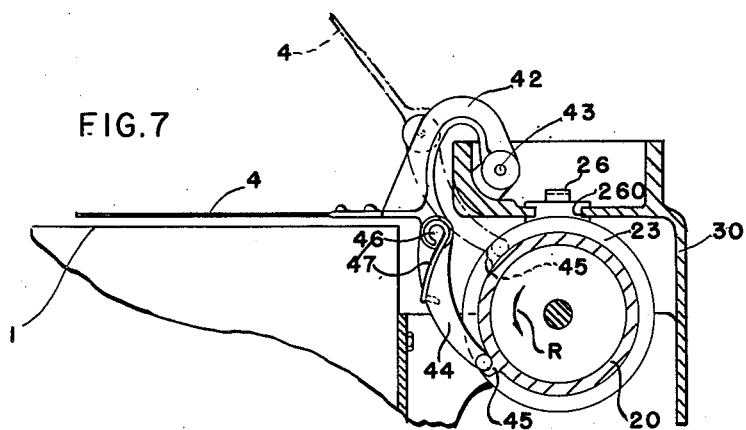
Figure 7 is an enlarged sectional view taken on line 7—7, Figure 3.

The cam drum 20 is, in effect, a reversely movable actuating part. The arm 44 and shoulder 45 on the drum constitute a one-way latch device with the shoulder located to come, during the actuation of said part, in juxtaposition to the arm 44 at the end portion of the movement or rotation of said part in a retrograde direction after unfolding the folders, in order to pick up the arm 44 during the last portion of the return movement of said part 20 in a retrograde direction and lift the form 4 prior to laying a shirt on the table 1. When said part of the drum is again actuated in a forward folding direction, the shoulder 45 first moves away from the arm 44, permitting the form to drop onto the table, or on a shirt dressed thereon just ahead of the start of the folding actuation of the folders by the cams 21, 22, 23 and 24. The rotation of the shoulder 45 to the lift portion of the cams of said part, or drum, is shown in Figure 7. The direction of rotation of the drum 20 in a forward direction to fold the folders is indicated by the arrow R, Figure 7. The position of the shoulder 45 when the drum 20 is in its starting position, or at the end of its retrograde return movement is indicated in the broken line position Figure 7.

During the rotation of the cam cylinder 20 counter-clockwise, Figure 7, or in the direction of the arrow R, Figures 7 and 8, in actuating the folders 5, 6, 7, 8, to fold the shirt, the arm 44, or the roller at the end thereof, rides on the periphery of the cylinder. When the form 4, with the folded shirt thereon, is lifted, as by the operation of the pedal 48, the folders, being interlocked in the folded shirt, are lifted therewith and hence, the support or housing 30 and all parts carried thereby, including the cam cylinder or drum 20, are rocked as a unit about the shaft 28. When the shirt is pulled off the form 20, and the pedal 48 released, the housing and parts assembled therewith return to normal position and hence, the form 4 and folded folders 5, 6, 7, 8, again overlie the table. The return of the support or housing 30 to normal, operates, as will be presently described, to cut off the supply of air to, and to exhaust the air from the cylinder 35, and to permit the air in the weaker cylinder 39 to actuate the cam cylinder or drum in a retrograde direction to unfold the folders 5, 6, 7, 8. The retrograde rotation or rocking of the cam cylinder 20 clockwise, Figure 7, lifts the form 4 due to the arm 44, or the roller thereof, being seated against the shoulder 45. Now, when the shirt is dressed on the table and the machine started so that the cam cylinder starts to move counter-clockwise, Figure 7, or in the direction of the arrow R, Figures 7 and 8, the roller of the arm 44 is moved away from the shoulder 45 so that the form and the arm 44 drop from the broken line position Figure 7 to the full line position, the arm 44 moving about its pivot 46 against the spring 47. The lift portions of the cams 21, 22, 23, 24, are so located, Figure 8, that the form 4 drops on the shirt dressed on the table before the lift portion of the first cam 21 to be operated reaches its follower 25. The form 4 is lifted by means of a pedal 48 at the base of the table frame and connected to a lift rod 49 extending upwardly and thrusting against the under side of the arm 42. The pedal also operates the neck band clamp to release the neck band.

The flow of power, as compressed air, to the cylinder 35 is controlled by means of a valve 50, this being a two-way valve or a combined intake and exhaust valve, and being normally closed and operated to open position by a push button 51, exposed on the end of the table remote from the folding mechanism, through a lever 52 pivoted at 53 and acting to depress the stem 54 of the valve member 55 to open its intake head 56 and close its exhaust head 57. The intake end of the valve 50 is connected to a main line air supply pipe 58, and the outlet of the valve 50 is connected by a pipe 59 to the cylinder 35, so that when the valve 50 is open, air will flow to the cylinder 55 and also actuate the cam cylinder 20 to fold the folders. The lever 52 of the valve mechanism is held in its operated position by a spring actuated latch 60 which is released, as will be presently described.

The air is supplied to the cylinder 39 of less capacity than the cylinder 35 through a branch pipe 61 connected to the main supply line and to the cylinder 39, this having a pressure reducing device 62 therein. The mechanism for tripping the latch 60 includes a pressure operated device, as a diaphragm 63 in a chamber 64 and operating a stem 65 which thrusts against a lever arm 66 on the latch 60, the diaphragm chamber being connected by a pipe 67 to one end of a cylinder 68 having a piston 69 therein, the rod of which is pivoted at 70 to a forwardly extending arm 700 on the housing 30, to which a returning spring 701 is connected. The piston has outside air inlet ports 71 intermediate of its ends.

When the shirt is folded by the folders 5, 6, 7, 8, as previously described, the operator depresses the pedal 48 and through the lift rod 49 tilts the form 4 into the broken line position Figure 2, and as the folders are interlocked in the folded shirt, the lifting force is transmitted to the support or housing 30, causing the support or housing to rock into the broken line position Figure 2, thus shifting the arm 700 upward so that it pulls the piston 69 upward in the cylinder 68 past the ports 71, letting the cylinder below the piston fill with outside air. The paper wrapper, or bag B, is placed on the shirt when the form is in elevated position. If a band is used, the band is wrapped around the folded shirt on the form before the form 4, with the shirt thereon, is lifted. The bands are taken from a magazine groove G on the table extending under the form. The operator then pulls the folded shirt endwise off the crank portions of the folders. The pedal 48 is released just prior to pulling the shirt off the form and folded folders so that the spring 701 reacts on the lever arm 700 to restore the support or housing 30 to its full line position Figure 2, and bring the folders and the form down on the table. The movement of the support or housing or the lever arm 70 gives a down thrust to the piston 69, which creates a momentary impulse of air through the pipe 67 to the diaphragm chamber 64 to actuate the diaphragm and release the latch 60, thus permitting the intake valve head 56 to close and the exhaust valve head 57 to open, releasing the air from the cylinder 35. Air then flows through the pipe 61 to the weaker cylinder 39 to actuate the piston 40 and turn the cam cylinder 20 in a retrograde direction and hence, restore the folders to starting position.

During retrograde turning of the cylinder or cam drum 20, the form 4 is again elevated, the roller at the end of the arm 44 being picked up by the shoulder 45, Figure 5, after the cams have unfolded the folders. The form 4 and the arm 44 are elevated into the broken line position Figure 7 during continued retrograde rotation of the drum 20. Upon the initial forward or counterclockwise rotation of the cam cylinder or drum 20, the roller at the end of the arm 44 is forced out of the notch about the pivot 46 of the arm 44, and the form 4 falls into position on the new shirt dressed on the table.

What we claim is:

1. A shirt folding machine including a table on which the shirt is laid flatwise with the sleeves overhanging the side edges of the table, the table having an intermediate folded shirt area between the side edges thereof, outside and inside pairs of folders, a support along one end of the table for the folders, the outside pair being hinged to the support on axes extending lengthwise of the side edges of the table, and the inside folders being hinged to the support on axes extending lengthwise of the side edges of the folded shirt area of the table, the outside folders including radial and crank portions, the radial portion of one outside folder being of such a length as to fold one sleeve across the median line of the table, and the radial portion of the other outside folder being of less radial length sufficient to fold the sleeve to the adjacent edge of the folded shirt area, the inside folders being of substantially the same radius to fold the side portions of the shirt onto the folded shirt area and together therewith folding the sleeves within the width of the folded shirt area with the cuffs entirely within that area, and actuating mechanism carried by the support and operable to actuate the outside folders successively and the inside folders successively to each other and to the outside folders.

2. A shirt folding machine including a table on which the shirt is laid flatwise with the sleeves overhanging the side edges of the table, the table having an intermediate folded shirt area between the side edges thereof, outside and inside pairs of folders, a support along one end of the table, the outside pair being hinged to the support on axes extending lengthwise of the side edges of the table, and the inside folders being hinged to the support on axes extending lengthwise of the side margins of the folded shirt area of the table, the outside folders including radial and crank portions normally hanging downward below the side edges of the table, the radial portion of one outside folder being of such length as to fold one sleeve across the median line of the table, and the radial portion of the other outside folder of less radial length and sufficient to fold the sleeve only to the near edge of the folded shirt area, the inside folders being of substantially equal radius sufficient to normally hold the crank portions along the side edges of the table, and to fold the side portions of the shirt and the folded sleeves over to the opposite margin of the folded shirt area, and power actuating mechanism operable to actuate the inside folders successively to the outside folders and each inside and outside folder successively to the other inside and outside folders respectively.

3. A shirt folding machine including a table on which the shirt is laid with the sleeves extending over the side portions of the table, outside and inside pairs of folders located for folding the sleeves and the lengthwise side portions of the shirt over on the intermedial portion, a form about which the shirt is folded normally overlying the intermediate area of the table at one end thereof, a support extending transversely of the table beyond said one end and having a rocking movement about a transverse horizontal axis, actuating mechanism for the folders carried by the support to rock as a unit therewith, including a reversely movable part to fold and unfold the folders, the folders being carried by the support to partake of the rocking movement thereof, the form being pivoted at one end to the support on a transverse axis and shiftable upward as a unit with the support when the shirt is folded around the form, to lift the folders and rock the support in one direction about its axis, returning means acting on the support to rock the folded folders and the form as a unit therewith in the opposite direction when the shirt is removed from the lifted form, a power system for the actuating mechanism including a manually operable member to control the flow of power to actuate said mechanism in one direction to fold the folders, and a second control member operated by the support during its return rocking movement of the support to control the actuation of said mechanism in the opposite direction to unfold the folders.

4. A shirt folding machine including a table on which the shirt is laid with the sleeves extending over the side portions of the table, outside and inside pairs of folders, located for folding the sleeves and the lengthwise side portions of the shirt over on the intermedial portion, a form about which the shirt is folded normally overlying the intermediate area of the table at one end thereof, a support extending transversely of the table beyond said one end and having a rocking movement about a transverse horizontal axis, actuating mechanism for the folders carried by the support to rock as a unit therewith, including a reversely movable part to fold and unfold the folders, the folders being carried by the support to partake of the rocking movement thereof, the form being pivoted at one end to the support on a transverse axis and shiftable upward as a unit with the support when the shirt is folded around the form, to lift the folders and rock the support in one direction about its axis, returning means acting on the support to rock the folded folders and the form as a unit therewith in the opposite direction when the shirt is removed from the lifted form, a power system for the actuating mechanism including a manually operable member to control the flow of power to actuate said mechanism in one direction to fold the folders, and a second control member operated by the support during its return rocking movement of the support to control the actuation of said mechanism in the opposite direction to unfold the folders, and a one-way clutch device pivoted to the form and arranged to clutch the form to said part to lift it during the movement of said part in the opposite direction in unfolding the folders.

5. A shirt folding machine including a table on which the shirt is laid with the sleeves extending over the side portions of the table, outside and inside pairs of folders, located for folding the sleeves and the lengthwise side portions of the shirt over on the intermedial portion, a form about which the shirt is folded normally overlying the intermediate area of the table at one end thereof, a support extending transversely of the table beyond said one end and having a rocking movement about a transverse horizontal axis, actuating mechanism for the folders carried by the support to rock as a unit therewith, including a reversely movable part to fold and unfold the folders, the folders being carried by the support to partake of the rocking movement thereof, the form being pivoted at one end to the support on a transverse axis and shiftable upward as a unit with the support when the shirt is folded around the form, to lift the folders and rock the support in one direction about its axis, returning means acting on the support to rock the folded folders and the form as a unit therewith in the opposite direction when the shirt is removed from the lifted form, a power system for the actuating mechanism including a manually operable member to control the flow of power to actuate said mechanism in one direction to fold the folders, and a second control member operated by the support during its return rocking movement of the support to control the actuation of said mechanism in the opposite direction to unfold the folders, and a one-way latch device including an arm carried by the form and a shoulder on said part for coacting with said arm and located to come in juxtaposition to the arm at the end of the folder actuation movement of said part to pick up said arm on the initial movement of said part in the reverse direction, and lift the form.

WALLACE F. GAYRING.
JOHN NEUROTH.

No references cited.